US006810982B2

United States Patent
Kuhn et al.

(10) Patent No.: US 6,810,982 B2
(45) Date of Patent: Nov. 2, 2004

(54) LIFT AXLE CONTROL

(75) Inventors: Dale L. Kuhn, Fort Wayne, IN (US);
Michael E. Stagg, Evansville, IN (US);
Burnell L. Bender, Woodburn, IN
(US); Steven W. Fuller, Leo, IN (US);
Anthony D. Sutton, Fort Wayne, IN
(US); Brandi L. Grimm, Fort Wayne,
IN (US); Joseph M. Smith, Bluffton,
IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 127 days.

(21) Appl. No.: 10/074,203

(22) Filed: Feb. 12, 2002

(65) Prior Publication Data

US 2003/0151221 A1 Aug. 14, 2003

(51) Int. Cl.$^7$ ................................................ B62D 61/12
(52) U.S. Cl. ..................................... 180/209; 280/86.5
(58) Field of Search ............................. 280/86.5, 43.17,
280/43.23, 683, DIG. 1; 180/24.02, 209

(56) References Cited

U.S. PATENT DOCUMENTS

| | | | | |
|---|---|---|---|---|
| 2,828,139 A | * | 3/1958 | Lautzenhiser | 280/6.158 |
| 3,201,141 A | * | 8/1965 | Bernstein et al. | 280/683 |
| 5,018,755 A | * | 5/1991 | McNeilus et al. | 280/81.1 |
| 5,549,322 A | * | 8/1996 | Hauri | 280/86.5 |
| 5,630,625 A | * | 5/1997 | Shaw | 280/838 |
| 6,398,236 B1 | * | 6/2002 | Richardson | 280/86.5 |
| 6,572,124 B2 | * | 6/2003 | Mlsna et al. | 280/86.5 |

\* cited by examiner

Primary Examiner—Paul N. Dickson
Assistant Examiner—Laura B. Rosenberg
(74) Attorney, Agent, or Firm—Jeffrey P. Calfa; Dennis Kelly Sullivan; Susan L. Lukasik

(57) ABSTRACT

A control for raising and lowering a lift axle (16) on a motor vehicle (10) having an ignition switch (106) for turning the motor on and off. The control has a circuit (32) that is fed through the ignition switch when the ignition switch is on but not when the ignition switch is off and that has a first switch device (102F) that requires actuation to enable the lift axle to be lowered and a second switch device (94D) that, once the first switch device has been actuated to enable the lift axle to be lowered, is effective upon being actuated to cause the lift axle to be lowered. Placement of the vehicle transmission in reverse automatically raises the lift axle if it has been lowered.

12 Claims, 3 Drawing Sheets

LIFT AXLE CONTROL

FIELD OF THE INVENTION

This invention relates generally to suspension systems of wheeled vehicles. More particularly, the invention relates to suspension system controls, specifically to a lift axle control for controlling the raising and lowering of a lift axle in a wheeled motor vehicle, such as highway tractor having an auxiliary lift axle that can be selectively raised and lowered, to selectively disengage its wheels from and engage its wheels with, the underlying road surface or terrain.

BACKGROUND AND SUMMARY OF THE INVENTION

A lift axle suspension system allows a lift axle to be selectively raised and lowered with respect to the undercarriage of a vehicle. When the lift axle is lowered, its wheels engage the underlying road surface or terrain, enabling the lift axle to bear some portion of the vehicle weight, while relieving some of the vehicle weight borne by other wheels that are engaging the underlying surface. When the lift axle is raised, its wheels disengage the underlying surface so that the lift axle ceases to support a portion of the vehicle weight.

The chassis of a heavy truck, a dump truck for example, typically has a pair of front wheels for steering the vehicle and a rear axle having driven wheels coupled through a differential to a driveshaft that extends from an output shaft of the transmission. Such a vehicle may also have an auxiliary lift axle in tandem with the driven rear axle.

When such a vehicle is hauling a load, the auxiliary axle may be lowered to bear some of the weight imposed on the vehicle by the impending load. When the vehicle is not loaded, the added support provided by the auxiliary axle may be unnecessary, in which event the auxiliary axle may be raised to disengage its wheels from the underlying surface. This can provide certain benefits that include a reduction in engine torque load allowing the vehicle to travel with better fuel economy, better vehicle maneuverability, and avoidance of wear on the auxiliary axle and its wheels and tires.

The suspension of a lift axle in a vehicle comprises load air springs disposed between the lift axle and the vehicle frame proximate the wheels at opposite ends of the lift axle. Inflating the load air springs lowers the lift axle to place its wheels on the underlying surface in support of the vehicle. The inflated load air springs may serve as at least a portion of the suspension of the lift axle from the vehicle undercarriage.

Lift air springs are disposed proximate the ends of the lift axle, in association with the suspension. Inflating the lift air springs, while deflating the load air springs, raises the lift axle to disengage its wheels from the underlying surface.

A known auxiliary lift axle control operates in a manner that causes a raised lift axle to be lowered when a vehicle on-off switch, sometimes called an ignition switch, that has been turned off to stop the vehicle engine, is once again turned on. The lowered lift axle can then be raised by the driver's operation of a switch. The known control also causes a lowered lift axle to be raised whenever the vehicle transmission is placed in reverse gear. Raising a lift axle when the vehicle is being driven in reverse may avoid the potential for damaging certain components of a lift axle, such as steering components of a steerable lift axle.

The present invention arises out of a belief that a preferred mode of operation for lowering a lift axle in some vehicles, like the one just described for example, should require an intentional act on the part of the vehicle driver that is additional, and subsequent, to the act of turning the ignition switch from off to on. The present invention comprises a control that requires such an additional intentional act by the driver in order to lower the lift axle. Yet, the disclosed preferred embodiment of the inventive control retains the automatic lifting of a lowered axle whenever the vehicle transmission is placed in reverse or whenever the ignition switch is turned off.

The preferred embodiment is constructed from known electric circuit devices connected to form a novel control circuit for a lift axle control. The devices include a momentary ENABLE switch, a latching relay, a REVERSE GEAR relay, and a two-position RAISE-LOWER selector switch for the lift axle. The novel control circuit is also coupled with the vehicle electrical system to receive both electric power and a REVERSE GEAR signal from the vehicle system.

The invention provides a cost-efficient solution for accomplishing the desired control functions for a lift axle.

One general aspect of the invention relates to a wheeled motor vehicle comprising an ignition switch for turning the motor of the vehicle on and off and an auxiliary lift axle that can be raised to lift wheels of the lift axle off an underlying surface on which the vehicle is supported and that can be lowered to place the wheels of the lift axle on the underlying surface. A control for raising and lowering the lift axle comprises a circuit that is fed through the ignition switch when the ignition switch is on but not when the ignition switch is off and that comprises a first switch device that requires actuation to enable the lift axle to be lowered and a second switch device that, once the first switch device has been actuated to enable the lift axle to be lowered, is effective upon being actuated to cause the lift axle to be lowered.

Another general aspect of the invention relates to a control for raising and lowering a lift axle on a motor vehicle having any ignition switch for turning the motor on and off. The control comprises a circuit that is fed through the ignition switch when the ignition switch is on but not when the ignition switch is off and that comprises a first switch device that requires actuation to enable the lift axle to be lowered and a second switch device that, once the first switch device has been actuated to enable the lift axle to be lowered, is effective upon being actuated to cause the lift axle to be lowered.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figure 1:
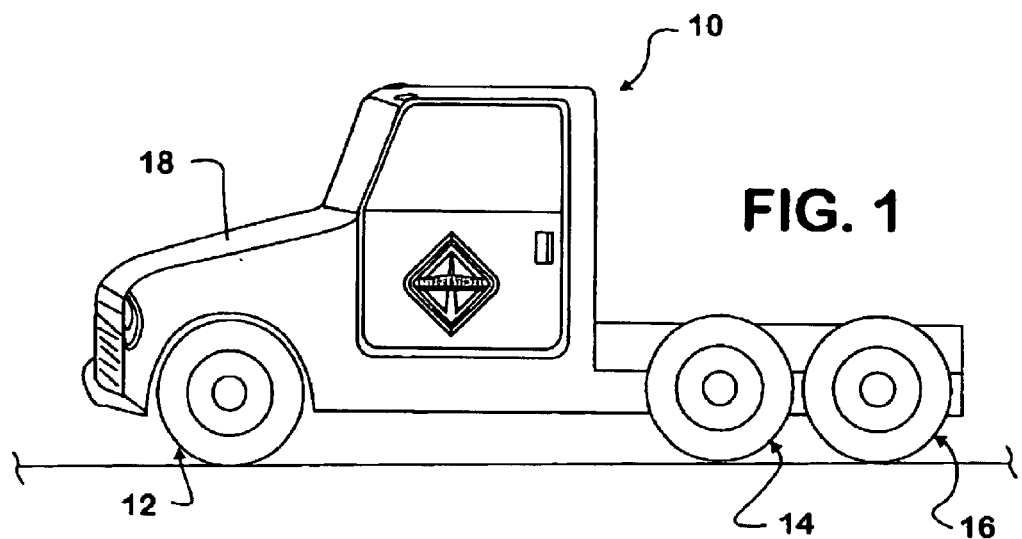
FIG. 1 shows a representative wheeled vehicle, specifically a heavy truck, that has an auxiliary lift axle controlled by a lift control system according to principles of the present invention.

FIG. 1 shows a motor vehicle 10, an example of which is the heavy truck that is illustrated, having a pair of front wheels 12 for steering the vehicle, a drive axle 14 having driven wheels at opposite ends for propelling the vehicle, and an auxiliary lift axle 16 having wheels at its opposite ends. FIG. 1 shows all wheels engaged with an underlying road surface to support the weight of the vehicle. An engine within an engine compartment 18 of the vehicle propels the vehicle through a drivetrain that includes a transmission, a driveshaft and drive axle 14. Drive axle 14 comprises a differential through which its wheels are coupled to the drive shaft. The side view of FIG. 1 obviously obstructs a direct viewing of the engine, the transmission, and the driveshaft in tractor 10.

Figure 2:
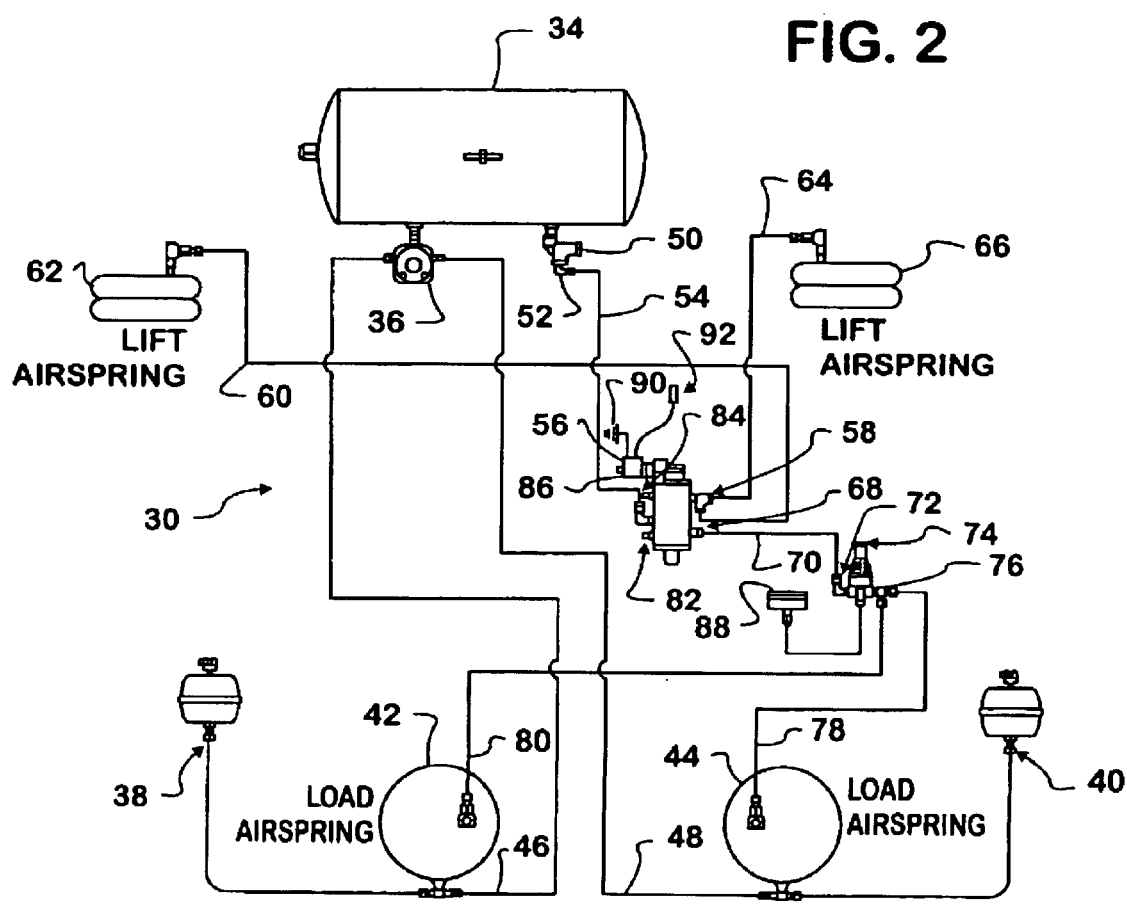
FIG. 2 is a schematic diagram of the pneumatic circuit portion of the lift control system.
Figure 3:
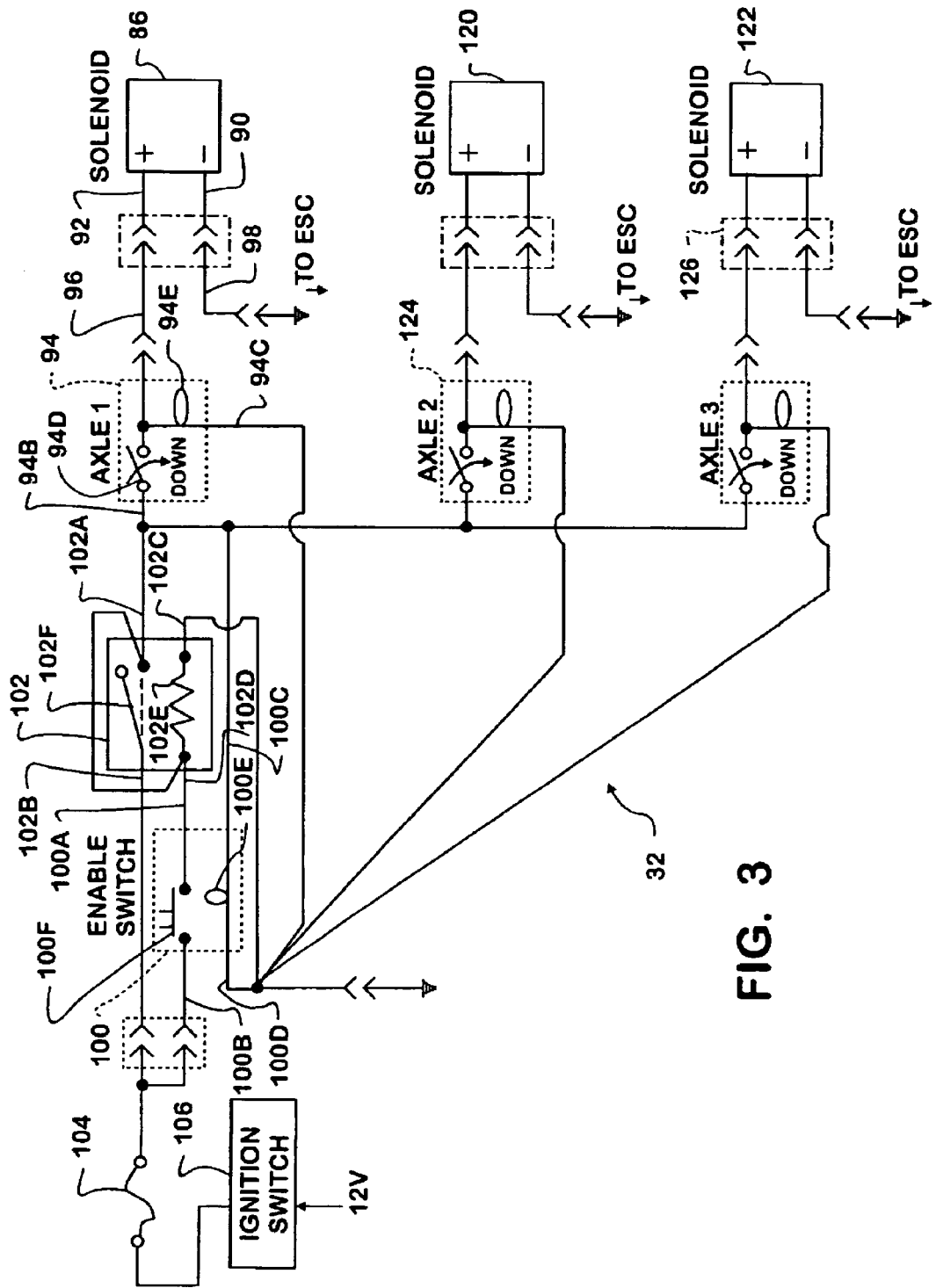
FIG. 3 is a schematic diagram of the electric circuit portion of the lift control system.

Lift axle 16 can be raised from the lowered position shown in FIG. 1 to a raised position where its wheels are lifted off the underlying surface. Raising and lowering of lift axle 16 are accomplished by a lift axle control, the pneumatic circuit portion 30 of which is shown in FIG. 2 and the electric circuit portion 32 of which is shown in FIG. 3. The lift axle control controls the operation of a mechanism that raises and lowers the lift axle.

Pneumatic circuit 30 comprises a compressed air tank 34 for holding a supply of compressed air. An inlet port of a brake relay valve 36 is connected to tank 34. One outlet port of valve 36 is connected to an air brake 38 associated with a wheel, or wheels, at one end of the lift axle, while another outlet port of valve 36 is connected to an air brake 40 associated with the wheel, or wheels, at the other end of the lift axle. Load springs 42 and 44 comprise inflatable and deflatable air springs that are disposed between lift axle 14 and the vehicle frame proximate the wheels at opposite ends of the lift axle. A formation on the exterior of each load spring provides a point of connection of a respective conduit 46, 48 from valve 36 to the respective air brake 38, 40. Valve 36, conduits 46, 48, and air brakes 38, 40 are shown chiefly for reference, as they play no part in controlling the inflation and deflation of load air springs 42 and 44. When lift axle 16 is in lowered position, as in FIG. 1, load air springs 42, 44 are inflated and function as at least a portion of the lift axle suspension from the vehicle undercarriage.

An inlet port of a brake protection valve 50 is coupled to tank 34. Valve 50 has an outlet port connected through an elbow 52 and conduit 54 to an inlet port of a solenoid-operated valve 56. One port of a three-port fitting 58 is connected to one outlet port of valve 56. A second port of fitting 58 is coupled through a conduit 60 to one lift spring 62 while a third port of fitting 58 is coupled through a conduit 64 to a second lift spring 66. Lift springs 62, 66 are prime movers for the mechanism that raises and lowers the lift axle, and they are disposed proximate respective ends of lift axle 16 and in association with the lift axle suspension. The lift springs comprise inflatable and deflatable air springs that are disposed between lift axle 16 and the vehicle frame proximate the wheels at opposite ends of the lift axle. The lift axle is raised off the underlying surface by deflating load springs 42, 44 and by inflating lift springs 62, 66.

A second outlet port of valve 56 is coupled through a swivel elbow 68, a conduit 70, and an elbow 72 to an inlet port of a pressure regulator valve 74. One port of a three-port fitting 76 is connected to an outlet port of regulator valve 74. A second port of fitting 76 is coupled through a conduit 78 to load air spring 44. A third port of fitting 76 is coupled through a conduit 80 to load air spring 42. Exhaust ports adjacent the inlet port of valve 56 contain small exhaust mufflers 82, 84.

Valve 56 further comprises a solenoid 86. When solenoid 86 is energized, valve 56 assumes a condition that communicates load air springs 42, 44 with tank 34 thereby inflating the load air springs with compressed air from tank 34 while exhausting compressed air from lift air springs 62, 66 through muffler 84, thereby deflating the lift air springs. When solenoid 86 is not energized, valve 56 assumes a condition that communicates lift air springs 62, 66 with tank 34 thereby inflating the lift air springs with compressed air from tank 34 while exhausting compressed air from load air springs 42, 44 through muffler 82, thereby deflating the load air springs. Valve 74 functions to limit pressure in the load air springs to a desired value when they are being pressurized through valve 56 from tank 34, but allows them to be exhausted when valve 56 operates to deflate them. A gauge 88 connected to valve 74 allows the load air spring pressure to be read.

Solenoid 86 has terminals 90, 92 via which it is electrically connected to electric circuit 32, shown in FIG. 3. One terminal 90 is connected to ground through an electronic system controller ESC; the other terminal 92 is connected to a terminal 94A of a two-position RAISE-LOWER switch 94. The connection may be made through a wire 96 in a wiring harness that may also contain a wire 98 for connecting terminal 90 to electronic system controller ESC, which causes ground to be applied to terminal 90 so long as the transmission is not in a reverse gear. Whenever the transmission is placed in a reverse gear, the electronic system controller ESC interrupts the ground to terminal 90, effectively creating an open circuit that prevents solenoid 86 from being energized.

In addition to terminal 94A, switch 94 comprises terminals 94B and 94C. Internally of switch 94, terminal 94A connects to terminal 94B through a normally open contact 94D, and to terminal 94C through an indicator lamp 94E. Terminal 94C is grounded, such as through a ground wire in a wiring harness connected to the switch. The drawing shows contact 94D open.

Additional circuit devices include a momentary ENABLE switch 100, and a latching relay 102.

Switch 100 comprises four terminals 100A, 100B, 100C, and 100D. Internally, switch 100 comprises an indicator lamp 100E that is connected between terminals 100C, 100D, and a normally open contact 100F between terminals 100A, 100B. Contact 100F is spring-biased open, but can be momentarily closed by manual operation of an external actuator, such as a push-button for example. The drawing shows contact 100F open.

Terminal 100D is connected to ground, and terminal 100C is connected to terminal 94B. Terminal 100B is connected through a circuit protection device 104 that is fed from the vehicle ignition switch 106 when the latter is on.

Relay 102 comprises four terminals 102A, 102B, 102C, and 102D. Internally, relay 102 comprises a coil 102E that is connected between terminals 102C, 102D, and a normally open contact 102F between terminals 102A, 102B. Contact 102F is open when coil 102E is not energized and closed when coil 102E is energized. The drawing shows the coil not energized.

Terminal 102B is connected through circuit protection device 104 to ignition switch 106. Terminals 102A, 94B, and 100C are connected in common.

The condition portrayed by FIG. 3 results in solenoid 86 not being energized, placing valve 56 in a condition where load springs 42, 44 are being exhausted through muffler 82 while lift springs 62, 66 are being pressurized from tank 34, and that condition places lift axle 16 in its raised position where its wheels are off the underlying road surface. Actuation of ENABLE switch 100 followed by closing of switch 94 will energize solenoid 86, operating valve 56 to vent the lift springs and pressurize the load springs, thereby lowering the lift axle onto the underlying surface.

With ignition switch 106 having been turned on, momentary closure of contact 100F energizes relay coil 102E to close relay contact 102F. Once closed, contact 102F seals relay 102 energized because of the connection of terminal 102A to terminal 102D. Relay 102 will remain sealed until the feed from ignition switch 106 ceases, such as when the ignition switch is turned off. Lamp 100E illuminates to indicate that relay 102 is in a condition enabling the lift axle to be raised and lowered.

With relay 102 having been sealed, the lift axle will be lowered whenever switch 94 is operated closed. So long as relay 102 continues to be sealed, the lift axle may be raised and lowered by opening and closing switch 94. With relay 102 sealed and switch 94 closed, lamp 94E illuminates to indicate that the control has requested lowering of the lift axle. Otherwise the lamp does not illuminate.

When ignition switch 106 is turned off, the supply of compressed air in tank 34 enables the lift axle to be lifted off the underlying surface. Simply turning the ignition switch back on will not however result in lowering of the lift axle. Before the lift axle can be lowered, switch 100 must be actuated. If switch 94 has been left on, the actuation of switch 100 will immediately lower the lift axle; but if switch 94 had been left off, it must be turned on in order to lower the lift axle.

Anytime that the transmission is placed in a reverse gear, the electronic system controller ESC renders it impossible to lower the lift axle if it is in its raised position and will cause the lift axle, if already lowered, to immediately be raised.

While the invention has so far been described with reference to a single lift axle 16 that is on a heavy truck, the invention can be applied to vehicles having multiple lift axles. FIG. 3 shows additional solenoids 120, 122, each of which is associated with a respective additional lift axle, and each of which controls a respective pneumatic circuit like circuit 30 in FIG. 2 in the same way that solenoid 86 controls circuit 30. A respective switch 124, 126, each like switch 94, is associated with a respective solenoid 120, 122 in the same way that switch 94 is associated with solenoid 86, and the electronic system controller ESC is associated with each solenoid 120, 122 in the same way as it is with solenoid 86.

The disclosed embodiment of the invention requires an intentional act on the part of the vehicle driver that is additional, and subsequent, to the act of turning the ignition switch from off to on in order to lower a raised lift axle. Yet, it retains the automatic lifting of a lowered axle whenever the vehicle transmission is placed in reverse or whenever the ignition switch is turned off. Switches 94 and 100, and switches 124 and 126 if present, are disposed where they can be conveniently accessed and viewed by the driver.

Figure 4:
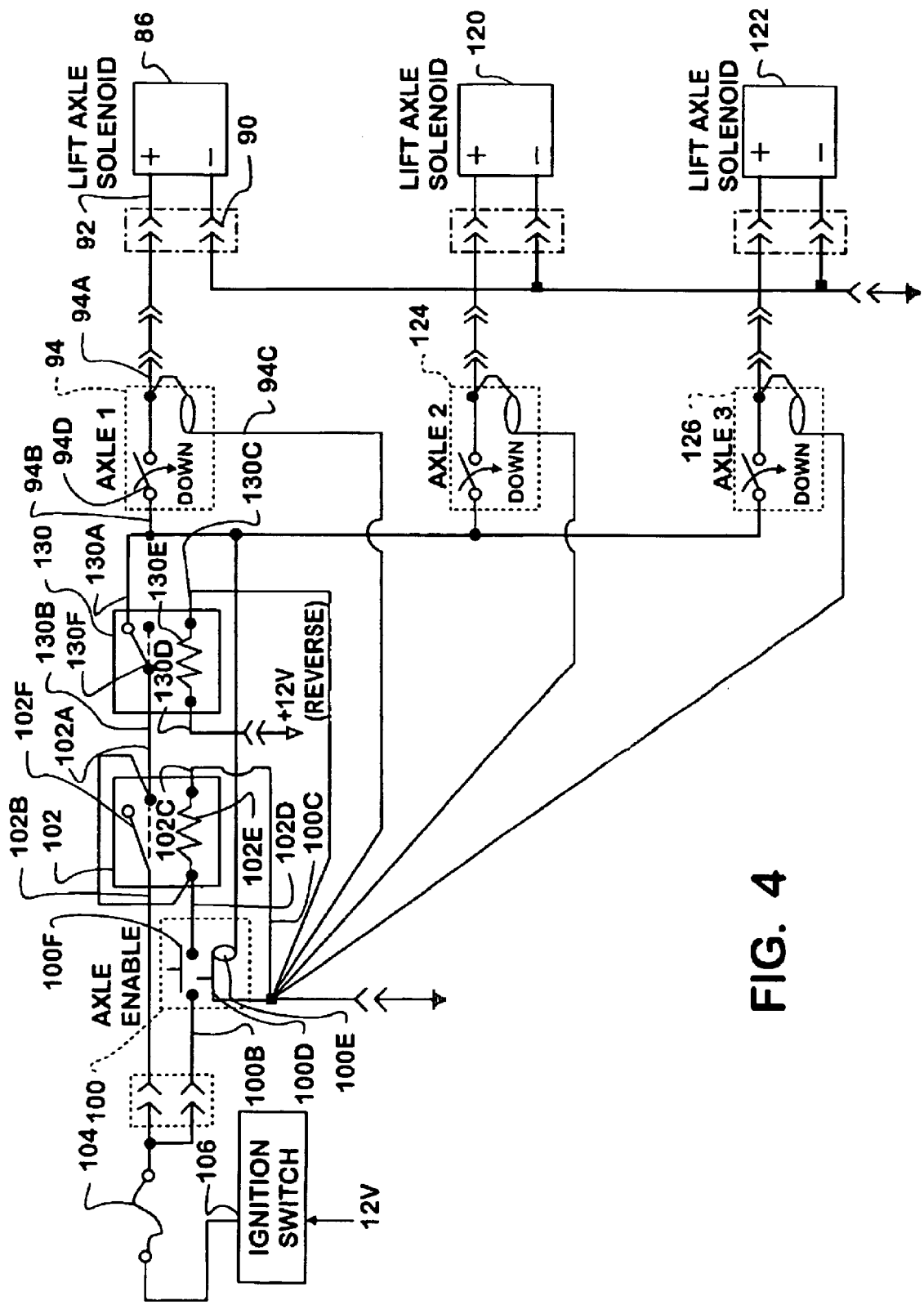
FIG. 4 is a schematic diagram showing a modified form for the electric circuit portion.

A modified form for the electric circuit portion is shown in FIG. 4. It is similar to FIG. 3, but differs in the following respects. A permanent ground connection, rather than an interruptible ground connection, is present at solenoid terminal 90. A second relay 130 is disposed between relay 102 and switch 94.

Relay 130 is a REVERSE GEAR relay and comprises four terminals 130A, 130B, 130C, and 130D. Internally, relay 130 comprises a coil 130E that is connected between terminals 130C, 130D, and a normally closed contact 130F between terminals 130A, 130B. Contact 130F is closed when coil 130E is not energized and open when coil 130E is energized. The drawing shows the coil not energized.

Relay 130 is placed in circuit between relay 102 and switch 94 with contact 130F in series between terminal 102A and terminal 94B, with terminal 130C connected to ground, and with terminal 130D connected to a source that supplies voltage for energizing the relay when the vehicle transmission is placed in a reverse drive gear.

The circuit of FIG. 4 functions with respect to raising and lowering of the lift axle in the same manner as described in connection with FIG. 3. So long as the transmission is in other than a reverse gear, the circuit of FIG. 4 is equivalent to that of FIG. 3 because contact 130F provides continuity between terminal 102A and contact 94D. However, placement of the transmission in a reverse gear will interrupt that continuity. If solenoid 86 is not being energized, interruption of that continuity is of no consequence because the lift axle is already raised. But if solenoid 86 is being energized, and the lift axle therefore lowered, interruption of that continuity will have the consequence of causing the lift axle to be raised. Relay 102 will continue to remain sealed until ignition switch 106 is turned off.

While a presently preferred embodiment of the invention has been illustrated and described, it should be appreciated that principles of the invention are applicable to all embodiments that fall within the scope of the following claims.

What is claimed is:

1. A wheeled motor vehicle that is propelled by a motor and comprises:

an ignition switch that can be turned on and off for turning the motor on and off;

an auxiliary lift axle that comprises wheels, that can be raised to lift the wheels of the lift axle off an underlying surface on which the vehicle is supported and that can be lowered to place the wheels of the lift axle on the underlying surface;

a control for raising and lowering the lift axle comprising a circuit that is fed through the ignition switch when the ignition switch is on but not when the ignition switch is off and that comprises a first switch device that requires actuation to enable the lift axle to be lowered and a second switch device that, once the first switch device has been actuated to enable the lift axle to be lowered, is effective upon being actuated to cause the lift axle to be lowered; and the first switch device comprises a relay having a normally open contact that is sealed closed upon the relay being energized by operation of an actuation switch for the relay.

2. A motor vehicle as set forth in claim 1 wherein the second switch device comprises a raise-lower switch that, when the relay contact has been sealed closed, is selectively operable to a lower position for causing the lift axle to be lowered and to a raise position for causing the lift axle to be raised.

3. A motor vehicle as set forth in claim 2 wherein the relay contact and raise-lower switch form a series circuit between the ignition switch and an electric control device for a raise-lower mechanism that raises and lowers the lift axle, and when complete, the series circuit causes voltage to be applied to the control device for causing the control device to lower the lift axle via the raise-lower mechanism.

4. A motor vehicle as set forth in claim 3 wherein the electric control device for the raise-lower mechanism comprises a solenoid-operated valve.

5. A motor vehicle as set forth in claim 3 wherein the raise-lower mechanism comprises a pneumatic device that is inflated to raise the lift axle.

6. A motor vehicle as set forth in claim 5 wherein the pneumatic device that is inflated to raise the lift axle comprises lift air springs proximate opposite ends of the lift axle.

7. A motor vehicle as set forth in claim 5 including load air springs for the axle that are being deflated while the pneumatic device is being inflated.

8. A wheeled motor vehicle that is propelled by a motor and comprises:
  an ignition switch that can be turned on and off for turning the motor on and off;
  an auxiliary lift axle that comprises wheels, that can be raised to lift the wheels of the lift axle off an underlying surface on which the vehicle is supported and that can be lowered to place the wheels of the lift axle on the underlying surface;
  a control for raising and lowering the lift axle comprising a circuit that is fed through the ignition switch when the ignition switch is on but not when the ignition switch is off and that comprises a first switch device that requires actuation to enable the lift axle to be lowered and a second switch device that, once the first switch device has been actuated to enable the lift axle to be lowered, is effective upon being actuated to cause the lift axle to be lowered;
  the first switch device comprises a relay having a normally open contact that is sealed closed upon the relay being energized by operation of an actuating switch for the relay;
  a transmission for selectively placing the vehicle in a forward drive gear and a reverse drive gear, and wherein, with the lift axle having been lowered, placement of the transmission in reverse drive gear causes the control to raise the lift axle; and
  wherein the first switch device comprises an enable relay having a normally open contact that is sealed closed upon the relay being energized by operation of an actuating switch for the relay, the control further comprises a reverse gear relay having a contact that is connected in series with the contact of the enable relay and that is normally closed as long as the transmission is not in a reverse drive gear, the second switch device comprises a raise-lower switch that, when the contact of the reverse gear relay is closed and the enable relay has been sealed closed, is selectively operable to a lower position for causing the lift axle to be lowered and to a raise position for causing the lift axis to be raised, but whenever the transmission is placed in a reverse drive gear while the lift axle is lowered, the contact of the reverse gear relay opens to cause the control to raise the lift axle.

9. A control for raising and lowering a lift axle on a motor vehicle having an ignition switch that can be turned on and off for turning a motor that propels the vehicle on and off, the control comprising:
  a circuit that is fed through the ignition switch when the ignition switch is on but not when the ignition switch is off and that comprises a first switch device that requires actuation to enable the lift axle to be lowered and a second switch device that, once the first switch device has been actuated to enable the lift axle to be lowered, is effective upon being actuated to cause the lift axle to be lowered; and
  wherein the first switch device comprises a relay having a normally open contact that is sealed closed upon the relay being energized by operation of an actuating switch for the relay.

10. A control as set forth in claim 9 wherein the second switch device comprises a lift-lower switch that, when the relay contact has been sealed closed, is selectively operable to a first position for causing the lift axle to be lowered and a second position for causing the lift axle to be raised.

11. A control as set forth in claim 10 wherein the relay contact lift-lower switch form a series circuit between the ignition switch and an electric control device for a lift-lower mechanism that raises and lowers the lift axle, and when complete, the series circuit causes voltage to be applied to the control device for causing the control device to lower the lift axle via the lift-lower mechanism.

12. A control for raising and lowering a lift axle on a motor vehicle having an ignition switch that can be turned on and off for turning a motor that propels the vehicle on and off, the control comprising:
  a circuit that is fed through the ignition switch when the ignition switch is on but not when the ignition switch is off and that comprises a first switch device that requires actuation to enable the lift axle to be lowered and a second switch device that, once the first switch device has been actuated to enable the lift axle to be lowered, is effective upon being actuated to cause the lift axle to be lowered;
  a third switch device that changes from one switch state to another switch state in response to occurrence of a signal indicating that a transmission of vehicle has been shifted into a reverse drive gear for causing the lift axle, if lowered, to be raised; and
  wherein the first switch device comprises an enable relay having a normally open contact that is sealed closed upon the relay being energized by operation of an actuating switch for the relay, the third switch device comprises a reverse gear relay having a contact that is connected in series with the contact of the enable relay and that is normally closed as long as the transmission is not in a reverse drive gear, the second switch device comprises a raise-lower switch that, when the contact of the reverse gear relay is closed and the enable relay has been sealed closed, is selectively operable to a lower position for causing the lift axle to be lowered and to a raise position for causing the lift axle to be raised, but whenever the signal indicating that the transmission has been shifted into a reverse drive gear occurs while the lift axle is lowered, the contact of the reverse gear relay opens for causing the lift axle to be raised.

* * * * *